United States Patent [19]

Chiang et al.

[11] Patent Number: 4,591,576

[45] Date of Patent: * May 27, 1986

[54] PROCESS FOR PREPARING CATALYTIC CRACKING CATALYSTS

[75] Inventors: Robert L. Chiang, Oakland, N.J.; Raymond G. Perigard, Ossining; Jule A. Rabo, Armonk, both of N.Y.

[73] Assignee: Union Carbide Corporation, Danbury, Conn.

[*] Notice: The portion of the term of this patent subsequent to May 13, 2003 has been disclaimed.

[21] Appl. No.: 659,641

[22] Filed: Oct. 3, 1984

[51] Int. Cl.$^4$ .............................................. B01J 29/06
[52] U.S. Cl. ........................................ 502/65; 502/66; 502/64; 502/68
[58] Field of Search .................... 502/65, 68, 64, 66

[56] References Cited

U.S. PATENT DOCUMENTS

| | | | |
|---|---|---|---|
| 3,575,887 | 4/1971 | Wilson | 252/442 |
| 3,619,412 | 11/1971 | Clement et al. | 208/111 |
| 3,620,960 | 11/1971 | Kozlowski et al. | 208/60 |
| 3,630,965 | 12/1971 | Voorhies et al. | 252/442 |
| 3,644,220 | 2/1972 | Kearby | 252/442 |
| 3,692,665 | 9/1972 | McDaniel et al. | 208/120 |
| 3,699,056 | 10/1972 | Takase | 252/442 |
| 3,702,312 | 11/1972 | Wilson | 252/442 |
| 3,835,030 | 9/1974 | Mattox et al. | 208/120 |
| 3,933,983 | 1/1976 | Elliott, Jr. | 423/328 |
| 4,324,697 | 4/1982 | Lewis et al. | 252/455 Z |
| 4,324,698 | 4/1982 | Lewis et al. | 252/455 Z |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |

OTHER PUBLICATIONS

R. R. Choudhary, "Fluorine Promoted Catalysts: Activity and Surface Properties", Ind. Eng. Chem., Prod. Res. Dev., vol. 16, No. 1, p. 12, 1977.
P. O. Scokart et al., "The Chemistry and Surface Chemistry of Fluorinated Alumina", 1978.

*Primary Examiner*—Carl F. Dees
*Attorney, Agent, or Firm*—Gary L. Wamer

[57] ABSTRACT

Catalytic cracking catalysts and catalytic cracking process wherein the cracking catalysts are prepared by: (i) contacting a mixture of a large pore zeolite and an inorganic oxide matrix at effective conditions of temperature, pH and time with a fluoro salt; and (ii) ammonium exchanging the product of step (i) to provide a catalyst having less than 2.0 percent by weight $Na_2O$, based on the weight of the zeolite. Optionally, the product is provided with an effective amount of at least one cation selected from the class consisting of cerium, lanthanum, praseodymium, neodymium, promethium, samarium, europium, lutetium, gadolinium, terbium, dysprosium, holmium, erbium, thulium and ytterbium.

74 Claims, No Drawings

PROCESS FOR PREPARING CATALYTIC CRACKING CATALYSTS

FIELD OF THE INVENTION

The present invention relates to catalytic cracking catalysts, their method of manufacture and to cracking processes employing such catalysts. The cracking catalysts comprise an inorganic oxide matrix and a large pore zeolite (6 Å to 15 Å) and are formed by a process that achieves a low concentration of sodium ions in the final catalyst, which can be achieved without the requirement of energy-intensive calcination steps as heretofore employed for $Na_2O$ removal.

BACKGROUND OF THE INVENTION

The prior art dealing with catalytic cracking catalysts is voluminous with a basic underlying goal being the preparation of modified zeolites for use as cracking catalysts. These zeolites are then added to alumina, silica, etc. as a matrix for the zeolite. The zeolitic component has generally been zeolite Y and has essentially been unchanged for over a decade. The development of the art of cracking catalysts has centered, for the most part, on preparing catalyst formulations by employing pretreated zeolites which are then subsequently admixed with various matrices. Representative of such developments are those disclosed in U.S. Pat. Nos. 3,140,249, 3,352,796, 3,312,615 and 3,542,670.

Another approach has been related to various secondary treatments for zeolites, such as processes to lower the alkali metal content of the basic zeolitic component (e.g., U.S. Pat. No. 3,293,192 and U.S. Pat. No. Re. 28,629) and processes to extract aluminum from the zeolitic framework (to enhance the thermal stability of the zeolite). Of course the latter processes necessarily result in products having sites where aluminum has been removed, and accordingly, the zeolites formed by such a process having certain instability as a result.

In EPC Application No. 81110620.3, having EPC Publication No. 82.211 and published June 29, 1983, incorporated herein by reference thereto, a new class of zeolites is disclosed and denominated therein as zeolite "LZ-210". This class of aluminosilicates comprises aluminosilicates having a chemical composition expressed in terms of mole ratios of oxides as:

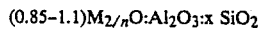

$$(0.85-1.1)M_{2/n}O:Al_2O_3:x\ SiO_2$$

wherein "M" is a cation having the valence "n", and "x" has a value greater then 6.0. LZ-210 is a new class of aluminosilicates having a faujasite structure and having an $SiO_2$ to $Al_2O_3$ ratio greater than 6.0 while not having the problems necessarily associated with dealuminated, i.e., aluminum extracted, zeolites.

Among the various prior art processes are processes involving the treatment of zeolites with halogen-containing compounds whereby residual fluoride is provided to the zeolite. Representative of patents for such processes are U.S. Pat. Nos. 3,620,960 (molybdenum fluoride); 3,630,965 (hydrofluoric acid); 3,644,220 (volatile halides selected from the group consisting of aluminum, zirconium, titanium, tin, molybdenum, tungsten, chromium, vanadium, antimony, bismuth, iron, platinum group metals and rare earths): 3,575,887 (fluorides and chlorides); 3,699,056 (halogenated hydrocarbons) 3,702,312 (fluorides and chlorides); 4,427,788 (ammoniacal aluminum fluoride solution for treatment of zeolites having a silica-to-alumina ratio greater than 100); and 4,427,790 (complex fluoranion treatment of zeolites having a silica-to-alumina ratio greater than 100).

U.S. Pat. No. 4,427,790 is a recent patent disclosing that certain fluoroanions provide enhancement in the activity of crystalline zeolites, but only when the zeolites have silica-to-alumina ratios greater than about 100. The patent also discloses the post-admixture of such treated products with matrix materials. Interestingly, the patent affirmatively teaches that the process is beneficial only for the treatment of such high silica zeolites and only when such zeolites are treated in the absence of any other component.

One variation of the above fluoride treatments for zeolites is disclosed in U.S. Pat. No. 3,619,412. The process of U.S. Pat. No. 3,619,412 comprises the treatment of a mixture of mordenite and amorphous silica-alumina with a solution of a fluorine compound such as ammonium difluoride or hydrofluoric acid. The hydrofluoric acid treatment is said to provide stability to the treated catalyst. Further, processes involving specific treatments of zeolites having silica-to-alumina ratios greater than 100 are disclosed in U.S. Pat. Nos. 4,427,786; 4,427,787; 4,427,789 and 4,427,791. U.S. Pat. No. 4,427,786 discloses the treatment of supported zeolites, wherein the zeolite has a silica-to-alumina ratio greater than 100, with boron fluoride, hydrolyzing of the boron fluoride, an ammonium salt exchange and calcination. A comparison of examples 2 and 9 therein shows that the activity of zeolites having a silica-to-alumina ratio of less than 70 showed a decrease in activity as a result of the process. U.S. Pat. No. 4,427,787 discloses the treatment on an alumina-supported zeolite, said zeolite having a silica-to-alumina ratio greater than 100, with a dilute aqueous solution of hydrogen fluoride. The hydrogen fluoride treatment is said to preferentially increase the activity of zeolites having silica-to-alumina ratios over 100. U.S. Pat. No. 4,427,789 discloses the treatment of an alumina-supported zeolite, said zeolite having a silica-to-alumina ratio greater than 100, with an aqueous solution of an alkali metal fluoride, impregnation with a warm solution of an ammonium salt and a calcination. U.S. Pat. No. 4,427,791 discloses a process for the treatment of an inorganic oxide material with ammonium fluoride or boron trifluoride, ammonium exchange, and calcination. The treatment is said to enhance the activity of the inorganic oxide material as a result of the ammonium exchange step.

The use of LZ-210 and forms of LZ-210 as catalysts is disclosed in copending and commonly assigned U.S. Ser. No. 490,965, filed May 2, 1983 and U.S. Ser. No. 500,446, filed June 2, 1983.

The instant invention relates to a new process wherein a large pore zeolite in combination with at least one inorganic oxide matrix component is contacted with specific fluoro salt solutions or slurries having a pH greater than 7, as discussed hereinafter, to provide catalysts useful in hydrocarbon conversion processes.

SUMMARY OF THE INVENTION

The above discussion of the prior art is instructive in appreciating the rather unusual and novel results observed in the instant invention. One of the most striking attributes of the instant invention is the heretofore unknown ability to achieve a catalyst comprising a large pore zeolite and inorganic oxide with a $Na_2O$ content (weight percent) less than about 2.0 weight percent, based on the weight of the zeolite, without the need of a calcination step to promote removal of Na₂O or by use of a commercially unrealistic number of ion exchange steps. A process has not heretofore been disclosed wherein Y zeolites are employed as components in catalysts without the use of a calcination step during their preparation. In fact, the prior art discloses the contrary. For example, U.S. Pat. No. 3,933,983 discloses treatment of a Y zeolite with solutions of ammonium fluorosilicate and ammonium sulfate. At column 12 of U.S. Pat. No. 3,933,983 in Table IV, the treated samples all have a Na₂O content of greater than 3.35 percent by weight (dry basis). Table IV also discloses that it was necessary to calcine the zeolites at temperatures of 600° F. prior to the rare earth exchange to achieve a reduction in the Na₂O content. Such calcination procedures have been employed heretofore in the prior art to provide for a thermal redistribution of the Na₂O present in the zeolite.

The instant process relates to the preparation of catalysts by treatment of a physical mixture of a large pore zeolite and an inorganic matrix with specific fluoro salts. The catalysts are useful in hydrocarbon conversion processes and in particular in catalytic cracking processes. Although the mechanism by which such novel catalysts are generated is not entirely understood, it is clear that the interactions of the zeolite, inorganic oxide matrix and the fluoro salt, in a slurry having a pH greater than 7 are unique in their ability to provide a final catalyst having a Na₂O content less than about 2.0 percent, based on the zeolite weight, by weight as characterized by the fact that such may be achieved without the requirement of a Na₂O calcination of the catalyst or zeolite contained in the catalyst. Further, it is evident that separate treatment of the zeolite and inorganic oxide matrix with subsequent mixture to form the catalysts does not result in a catalyst having the same catalytic characteristics as the catalysts of the instant invention. Although a thermal calcination is not required to achieve catalysts having low Na₂O contents, it is clear that the treatment of mixtures of a large pore zeolite and an inorganic oxide matrix may provide beneficial results when such calcinations are carried out on the finished catalyst and accordingly, optional calcinations are not excluded from the scope of the instant invention.

The process of the instant invention employs catalysts prepared by contacting a mixture of a large pore zeolite and an inorganic oxide matrix with an effective amount of a fluoro salt of the formula:

$$A_{(n-m)}[MF_n]_z$$

wherein "A" is an organic or inorganic ionic moiety, e.g., ammonium or quaternary ammonium ions; $[MF_n]_z$ is a fluoroanion moiety comprising the element "M"; "M" is an element selected from the group of elements from Groups VB, VIB, VIIB, VIII, IIIA, IVA and VA of the Periodic Table of Elements (Sargent—Welch Scientific Company) and rare earth elements; representative of permissible elements, i.e., "M", are boron, aluminum, gallium, silicon, phosphorus, antimony, bismuth, palladium, platinum, iridium, iron, rhenium, molybdenum, tantalum and titanium; "n" is the coordination number of "M"; "m" is the valence of "M"; and "z" is the valence or charge associated with "A". The fluoro salt is present in an effective amount and is in the form of an aqueous solution or slurry. The effective amount of fluoro salt is preferably an amount of at least 0.0075 moles per 100 grams of the large pore zeolite on an anhydrous basis. The aqueous solution or slurry of the fluoro salt, zeolite and matrix component has a pH greater than about 7, preferably having a pH within the range of 7.5 to about 9, more preferably between about 7.5 and about 8.5, at effective conditions of temperature and time. The catalyst product obtained after the treatment with the fluoro salt is then preferably treated by ammonium exchanging the product with ammonium ions, preferably in an amount of between about 1.0 to 10 moles of ammonium ions per 100 grams of the large pore zeolite, the weight of zeolite being on an anhydrous basis. The resulting catalysts have a Na₂O content less than 2.0 percent by weight, preferably less than 1.5 and more preferably less than 1.0, based on the total weight of the large pore zeolite.

The above catalysts may be provided with a catalytically effective amount of at least one rare earth cation selected from the group consisting of cerium, lanthanum, praseodymium, neodymium, promethium, samarium, europium, lutetium, gadolinium, terbium, dysprosium, holmium, erbium, thulium and ytterbium to provide, preferably, between about 0.1 percent by weight and about 20 percent by weight, based on the total weight of the large pore zeolite employed in the catalyst, of at least one or more of the aforementioned rare earth cations.

DETAILED DESCRIPTION OF THE INVENTION

The present invention relates to new catalysts prepared by contacting a mixture of a large pore zeolite and an inorganic oxide matrix with an effective amount of fluoro salt of the formula:

$$A_{(n-m)}[MF_n]_z$$

wherein "A" is an organic or inorganic ionic moiety, e.g., ammonium and quaternary ammonium ions; $[MF_n]_z$ is a fluoroanion moiety comprising the element "M"; "M" is an element selected from the group of elements from Groups VB, VIB, VIIB, VIII, IIIA, IVA and VA of the Periodic Table of Elements (Sargent—Welch Scientific Company) and rare earth elements, such as, for example, boron, aluminum, gallium, silicon, phosphorus, antimony, bismuth, palladium, platinum, iridium, iron, rhenium, molybdenum, tantalum and titanium; "n" is the coordination number of "M"; "m" is the valence of "M"; and "z" is the valence or charge associated with "A". The fluoro salt is employed in an effective amount to achieve the desired Na₂O level and is preferably an amount of at least 0.0075 moles per 100 grams of the large pore zeolite, on an anhydrous basis. The aqueous slurry of the fluoro salt, large pore zeolite and inorganic oxide matrix component(s) has a pH greater than 7, preferably having a pH within the range of about 7.5 to about 9, and more preferably between about 7.5 and about 8.5, and is at effective conditions of temperature and time. The product is preferably treated by ammonium exchanging the resultant product of the fluoro salt treatment with ammonium ions, preferably in an amount of between about 1 mole to about 10 moles of ammonium ions per 100 grams of the large pore zeolite, on an anhydrous basis. The resulting catalysts have a Na₂O content less than 2.0 percent by weight, preferably less than 1.5 and more preferably less than 1.0, based on the total weight of the large pore zeolite and such can be achieved without a Na$_2$O calcination, as described hereinafter.

Further, the catalysts of this invention may be provided with a catalytically effective amount of at least one cation selected from the class consisting of cerium, lanthanum, praseodymium, neodymium, promethium, samarium, europium, lutetium, gadolinium, terbium, dysprosium, holmium, erbium, thulium and ytterbium to provide between about 0.1 percent by weight and about 20 percent by weight, based on the total weight of the zeolite component employed in the catalyst, of at least one or more of the aforementioned rare earth cations. Rare earth cations are preferably present in an amount between about 1 percent by weight and about 12 percent by weight and more preferably in an amount between about 2 percent and about 9 percent by weight, based on the total weight of the large pore zeolite employed in the catalyst.

In this disclosure, including the appended claims, the terms "Na$_2$O calcination" or characterization of a large pore zeolite or catalyst as "non-calcined" are employed to denominate a thermal treatment of the large pore zeolite (alone or in combination with the inorganic oxide matrix) at an effective temperature to effect a thermal redistribution of cations, e.g., alkali metal cations, associated with the zeolite to promote removal of such by ion exchange. The term "Na$_2$O calcination" as such applies to Na$_2$O removal from a zeolite, is generally understood by those skilled in the art of zeolites to include treatments at temperatures of 300° C. or greater for about 1 hour, since at such a temperature and for such a period of time at least some redistribution of the cations associated with the zeolite is effected. For example, in the commercial preparation of catalytic cracking catalysts the zeolite is calcined at temperatures of 500° C. or greater to redistribute Na$_2$O and facilitate ion-exchange of sodium ions in a post-calcination ion exchange. Processes, such as spray drying, which are carried out at temperatures of about 200° C. for a period of 5 seconds or less are not considered to come within the scope of the term "Na$_2$O calcination", since such processes are of such short duration that no redistribution of the cations associated with the zeolite occurs. Further, a thermal treatment step not followed by a cation exchange, e.g., ammonium ion or rare earth cation exchange, is not a "Na$_2$O calcination" within the meaning of this invention, since such has not been carried out to effect the removal of cations, e.g., sodium cations, associated with the zeolite, and as a result facilitate by thermal means an increase in the ease of ion exchange of such cations. Although a thermal calcination is not required to achieve catalysts having low Na$_2$O contents, it is clear that treatment of mixtures of an inorganic oxide matrix may provide beneficial results when such calcinations are carried out on the finished catalyst and, accordingly, are not excluded from the scope of the instant invention.

The term "large pore zeolite", also generally referred to herein as "zeolite", is employed herein to denominate zeolites having a pore size greater than about 6 Angstroms and preferably having an average pore size from about 6 Angstroms to about 15 Angstroms. Representative zeolites include zeolite Y, zeolite X, zeolite beta (U.S. Pat. No. 3,308,069), Zeolite ZK-20 (U.S. Pat. No. 3,446,727), LZ-210 (E.P.C. Publication No. 82,211; June 29, 1983, incorporated herein by reference thereto), Zeolite ZSM-3 (U.S. Pat. No. 3,415,736), ZSM-type zeolites, zeolite L, zeolite omega, mordenite, faujasite and mixtures thereof.

The form of the starting large pore zeolite is often that of an alkali metal aluminosilicate or may be partially in the ammonium form. The large pore zeolite may be provided with ammonium ions by ammonium exchanging such prior to admixture with the inorganic matrix or the mixture may be ammonium or cation exchanged prior to contacting the mixture with the fluoro salt solution or slurry. It is preferred to subject the large pore zeolite to at least a partial ammonium exchange prior to use in the instant process.

The preferred large pore zeolites are Y-type zeolites, i.e., zeolites having the essential X-ray pattern of zeolite Y, having a SiO$_2$ to Al$_2$O$_3$ ratio greater than about 3.5 and preferably greater than about 4.5 to about 6. Y zeolites having SiO$_2$ to Al$_2$O$_3$ ratios of greater than about 3.5 are disclosed in U.S. Pat. No. 3,130,007. Y zeolites are commercially available from Union Carbide Corporation under the trade designations "Y-52" and "Y-62". "Y-52" and "Y-62" are generally described in Zeolite Catalyst Data Sheets F-3858C (7/79) and F-3480C (7/79) respectively, available from Union Carbide Corporation, Danbury, Conn., incorporated herein by reference. Representative Y-type zeolites believed employable herein include but are not limited to those disclosed in U.S. Pat. Nos.: 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,966,882; and 3,957,623. The aforementioned patents are merely representative of Y zeolites having SiO$_2$ to Al$_2$O$_3$ ratios greater than about 3.5 and are not intended to be a complete listing of the Y zeolites employable herein. As above noted, the preferred Y zeolites are those having a SiO$_2$/Al$_2$O$_3$ ratio between about 4.5 and about 5.5 and desirably have at least a portion of the zeolites' original cations exchanged with ammonium ions, i.e., are at least partially in the ammonium form. One advantage of the instant process is the use of Y zeolites that have not been thermally treated to effect the thermal rearrangement of the cations of the Y zeolite. Accordingly, Y zeolites such as Y-52 and Y-62 or similarly prepared zeolites are preferred for use in the process of the instant invention. The nature and preparation of such forms of zeolite Y are exemplified by the aforementioned patents and are well known in the art.

In one embodiment of the instant invention catalytic cracking catalysts are prepared by contacting a mixture of a non-calcined Y zeolite having a SiO$_2$/Al$_2$O$_3$ ratio between about 3.5 and less than 6.0, and an inorganic matrix, wherein the mixture comprises between about 5 and about 40 weight percent of zeolite Y, between about 10 and about 25 weight percent of an acid silica sol and about 45 and about 75 weight percent of a clay, preferably a kaolin clay, with an aqueous fluoro salt solution or slurry, to provide a mixture of zeolite, matrix and fluoro salt having a pH greater than 7, as hereinafter defined, at effective conditions of concentration, temperature and time. The pH of the slurry may be maintained at the appropriate pH by addition of acidic or basic additives, e.g., salts, to provide a slurry in the selected pH range. In a further embodiment the fluoro salt is selected from the group consisting of ammonium hexafluorosilicate and ammonium hexafluorotitanate.

The term "fluoro salts" as employed herein denominates salts generally characterized by the formula:

$$A_{(n-m)}[MF_n]_z$$

wherein "A" is an organic or inorganic ionic moiety such as ammonium and quaternary ammonium; $[MF_n]_z$ is a fluoroanion moiety comprising the element "M"; "M" is an element selected from the group of elements from Groups VB, VIB, VIIB, VIII, IIIA, IVA and VA of the Periodic Table of Elements (Sargent-Welch Scientific Company) and rare earth elements, such as, for example, boron, aluminum, gallium, silicon, phosphorus, antimony, bismuth, palladium, platinum, iridium, iron, rhenium, molybdenum, tantalum and titanium; "n" is the coordination number of "M"; "m" is the valence of "M"; and "z" is the valence or charge associated with "A". The fluoroanion "$[MF_n]_z$" may include but is not limited to $BF_4^-$, $AlF_4^-$, $PF_6^-$, $BiF_4^-$, $AlF_5^{-2}$, $SiF_6^{-2}$, $SbF_5^{-2}$, $FeF_4^{-2}$, $PtF_6^{-2}$, $AlF_6^{-3}$, $PdF_7^{-3}$, $TaF_8^{-3}$, $TiF_6^{-2}$ and mixtures thereof.

Fluoro salts in accordance with the above formula include ammonium tetrafluoroaluminate, ammonium hexafluorophosphate, ammonium tetrafluorobismuthate, ammonium pentafluoroaluminates, ammonium hexafluorosilicates, ammonium pentafluoroantimonate, ammonium tetrafluoroferrite, ammonium hexafluoroplatinate, ammonium hexafluoroaluminate, ammonium octafluorotantalate, ammonium heptafluoropalladate, tetramethylammonium tetrafluoroborate, ammonium tetrafluoroborate and ammonium hexafluorotitanate. In the preferred operation of the instant invention the fluoro salt is selected as either a hexafluorosilicate or a hexafluorotitanate, preferably the ammonium or quaternary ammonium salts thereof, as hereinafter discussed in greater detail.

Theoretically, there is no lower limit for the concentration of the fluoro salt in the aqueous solution or slurry employed herein in forming the slurry of the zeolite, fluoro salt and inorganic oxide matrix, provided of course the effective pH of the fluoro salt solution is selected to avoid undue destructive attack on the zeolite structure and the inorganic oxide matrix. As aforementioned, the pH of the slurry containing the fluoro salt zeolite and inorganic oxide matrix is greater than 7 and is preferably between about 7.5 and about 9.0. Relatively slow rates of addition of the fluoro salt solution may be beneficial in providing for adequate time for contacting the fluoro salt and the combined large pore zeolite and inorganic oxide matrix while minimizing possible consequent collapse of the crystal structure of the zeolite and/or any detrimental effect on the inorganic oxide matrix. Practical commercial considerations may require that the reaction proceed as rapidly as possible, and accordingly the effectiv conditions of reaction temperature and concentration of fluoro salts may be optimized with respect to the selected large pore zeolite and inorganic oxide matrix. It is believed that in general the more highly siliceous the large pore zeolite, the higher the permissible reaction temperature. Of course, the presence of the inorganic oxide matrix may serve to both dilute and buffer the effect of the fluoro salt on the zeolite component. Typically the reaction temperature is greater than about 0° C. and is preferably between about 10° C. and about 200° C. are believed employable in some instances depending on the selected fluoro salt, solvent, if any, for the fluoro salt and the particular form of the zeolite and inorganic oxide matrix employed. In most instances the temperature will be greater than 25° C. to about 150° C. and is preferably greater than 50° C. and between about 50° C. and 100° C.

The pH of the slurry of the fluoro salt, large pore zeolite and inorganic oxide matrix component(s) is greater than 7, preferably between about 7.5 and about 9.0 and is more preferably between about 7.5 and about 8.5 at the selected process temperature. Although the exact nature of the mechanism is not known it is observed that the use of fluoro salt solutions having a pH greater than 7 is unique in its effect on the $Na_2O$ content of the catalyst and in the retention of high crystallinity of the starting zeolite in the finished catalyst. The use of fluoro salt solutions having a pH greater than 7 has been observed to result in products containing more crystalline zeolitic components than similarly treated mixtures where the fluoro salt solution has a pH less than 7.

The effective concentration of the fluoro salt in the solution or slurry may be correlated to the temperature, pH and with the time of contact between the zeolite and inorganic oxide matrix and the fluoro salt solution and with the relative proportions of zeolite and the inorganic oxide matrix. Fluoro salt solutions having fluoro salt concentrations of from about $10^{-3}$ moles per liter of solution up to saturation can generally be employed herein, but it is preferred that concentrations in the range of 0.5 to 1.0 moles of fluoro salt per liter of solution be used. These concentration values are with respect to true solutions, and are not intended to apply to the total fluoro salt in slurries of salts in water. Even very slightly soluble fluoro salts can be slurried in a solvent, e.g., water, and used as a reagent, the undissolved solids being readily available to replace dissolved molecular species consumed in reaction with the zeolite and inorganic oxide matrix. As stated hereinabove, the amount of dissolved fluoro salts employed with respect to the particular combination of large pore zeolite and inorganic oxide matrix being treated will depend to some extent upon the physical and chemical properties of the particular form of large pore zeolite and the particular inorganic oxide matrix component(s), as well as other process conditions as herein discussed in the instant application. The effective amount of fluoro salt to be added is that amount which achieves a final product having a $Na_2O$ content less than 2.0 percent by weight based on the zeolite without the use of a calcination step. The effective amount of fluoro salt is preferably greater than 0.0075 moles of fluoro salt per 100 grams of the large pore zeolite, based on the anhydrous weight of the zeolite, and is preferably between about 0.01 and about 0.25. In one embodiment, a Y zeolite is employed and the preferred value of fluoro salt is between about 0.05 to about 0.25 moles of fluoro salt per 100 grams of large pore Y zeolite, based on the anhydrous weight of the Y zeolite.

The effective concentration of the ammonium salt in the ammonium exchange step may be correlated to the temperature and contact time between the mixture of the large pore zeolite and inorganic oxide matrix and the ammonium-containing solutions. Ammonium salt solution having ammonium ion concentrations of from $10^{-3}$ moles per liter of solution up to saturation can generally be employed herein. The effective amount of ammonium ion is preferably in the range of between about 1.0 and about 20.0 moles per 100 grams of large pore zeolite, on an anhydrous basis, more preferably between about 1.0 and about 10.0 and most preferably between about 1.5 and about 8.0 moles of ammonium per 100 grams of large pore zeolite, based on the anhydrous weight. This effective amount of ammonium ion may be provided in a single ion exchange step, but is usually and preferably provided in two or more ion exchange steps. The ammonium salt solutions may be formed from any organic or inorganic species that forms ammonium ions on addition to water. Representative salts are ammonium salts, such as ammonium carboxylates (e.g., acetate), nitrate, sulfate, chloride, bromide, fluoride, carbonate and the like. In one embodiment ammonium ions are provided with the fluoro salt to effect ammonium exchange of the catalyst coincident with the fluoro salt treatment. In this embodiment the ammonium ion concentration is greater than that present as a result of any ammonium ion present as a result of the fluoro salt.

It is desirable that the integrity of the zeolite crystal structure be maintained throughout the instant process. The rate of contacting of the mixture of large pore zeolite and inorganic oxide matrix with the fluoro salt is preferably at a rate such that the zeolite retains in the final catalyst of at least 50, preferably 80 and more preferably at least 90 percent of its original crystallinity. Retention of crystallinity in excess of 80% has been observed. Further, the use of a fluoro salt solution or slurry having a pH greater than 7 has been observed to provide catalyst products having a higher degree of crystallinity of the zeolite component than observed for fluoro salt solutions having a pH less than 7. This retention of crystallinity can result in a reduction in the total amount of zeolite employed in the finished catalyst.

Techniques for measuring crystallinity of zeolites are well known. A convenient technique for assessing the crystallinity of the Y zeolite relative to the crystallinity of the starting Y zeolite is the comparison of the relative intensities of the d-spacings of their respective X-ray powder diffraction patterns. The sum of the peak heights, in terms of arbitrary units above background, of the starting material is used as the standard and is compared with the corresponding area heights of the products. When, for example, the numerical sum of the peak areas of the product is 85 percent of the value of the sum of the area heights of the starting zeolite, then 85 percent of the crystallinity has been retained. In practice it is common to utilize only a portion of the d-spacings for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T) as described in J. Am. Chem. Soc., 60, 309 (1938) using nitrogen as the adsorbate. In determining the adsorption capacity, the capacity for oxygen at $-183°$ C. at 100 Torr is preferred.

The essential X-ray powder diffraction patterns may be obtained using standard X-ray powder diffraction techniques. The radiation source is a high-intensity, copper target, x-ray tube operated at 50 Kv and 40 ma. The diffraction pattern from the copper K-alpha radiation and graphite monochromator is suitably recorded by an X-ray spectrometer scintillation counter, pulse-height analyzer and strip-chart recorder. Flat compressed powder samples are scanned at $2°$ (2 theta) per minute, using a 2 second time constant. Interplanar spacings (d) are obtained from the position of the diffraction peaks expressed as $2\theta$, where $\theta$ is the Bragg angle, as observed on the strip chart. Intensities are determined from the heights of diffraction peaks after subtracting background.

INORGANIC OXIDE MATRIX COMPONENTS

The catalysts of the present invention are formed from at least one large pore zeolite and at least one inorganic oxide matrix component. As aforementioned, the large pore zeolite and inorganic oxide matrix component(s) are physically combined prior to the treatment with the fluoro salt solution or slurry.

The inorganic oxide matrix component may be a porous alumina matrix having discrete particles of various porous aluminas and/or crystalline aluminas. Porous alumina matrices are generally in the form of discrete particles having total surface areas, as measured by the method of Brunauer, Emmett and Teller (BET), greater than about 20 square meters per gram ($M^2/g$), preferably greater than about 40 $M^2/g$, and more preferably, from about 100 $M^2/g$ to about 300 $M^2/g$. The pore volume of such alumina matrices will typically be greater than 0.35 cubic centimeters per gram (cc/g). The average particle size of such alumina particles is generally less than 10 microns and preferably less than about 3 microns. The alumina matrix may be preformed and placed in a physical form such that its surface area and pore structure, if any, are stabilized so that when it is added to an impure, inorganic gel containing considerable amounts of residual soluble salts, especially sodium salts, the salts will not alter the surface and pore characteristics measurably nor will they promote chemical attack on preformed porous aluminas. For example, the alumina matrix may be an alumina which has been formed by suitable chemical reaction, slurry aged, filtered, dried, washed substantially free of residual salt, e.g., $Na_2SO_4$, and then heated to reduce its volatile content to less than about 15 weight percent. The alumina binder may be present with the zeolite and any other inorganic oxide matrix component in an amount ranging from about 1 to about 99 weight percent and is often present in an amount from about 5 to about 90 weight percent, based on the total weight of the finished catalyst. Further, an alumina hydrosol or hydrogel or hydrous alumina slurry may be used initially in the preparation of the catalyst as precursor of the discrete particles of alumina in the final catalyst. British Patent Specification No. 1,315,533, published May 2, 1983, incorporated herein by reference, is representative of an inorganic matrix formed using an alumina sol.

A wide variety of inorganic oxide matrix components may be employed in addition to or in substitution of an alumina matrix. Representatives of such matrix systems are disclosed in U.S. Pat. Nos. 3,446,727 and 4,086,187, such U.S. Patents being incorporated herein by reference. Accordingly, inorganic oxide matrices which are employable herein include amorphous catalytic inorganic oxides, such as silica, alumina, silica-alumina, silica-zirconia, silica-magnesia, alumina-boria, alumina-titania and the like and mixtures thereof. The use of acid silica and acid alumina sols are representative of silicas and aluminas employed in forming such matrices. The inorganic oxide gel may be an amorphous silica-alumina component such as a conventional silica-alumina cracking catalyst, several types and compositions of which are commercially available. These materials are generally prepared as a cogel of silica and alumina or as alumina precipitated on a preformed and preaged hydrogel. U.S. Pat. No. 4,086,187 is representative of an inorganic matrix formed using an acid silica sol. The silica may be present as a component in the solids present in said gels, in an amount between about 10 and about 99 weight percent and preferably between about 20 and about 90 weight percent. The silica may also be employed in the form of cogel comprising about 75 weight percent silica and about 25 weight percent alumina or comprising about 87 weight percent silica and about 13 weight percent alumina.

Another method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering, drying, reslurrying in water to remove sodium and sulfate ions and drying to reduce volatile matter content to less than 15 weight percent. The alumina may then be slurried in water and blended in proper amounts with a slurry of impure silica-alumina hydrogel. The zeolite component(s) may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst may then be dried to a residual water content of less than about 15 weight percent.

The inorganic oxide matrix component(s) will typically be present in the catalyst in an amount between about 10 and about 99 weight percent, preferably between about 30 and about 80 weight percent, based on the total catalyst. It is also within the scope of the instant invention to employ other materials with the final cracking catalysts, including various other types of molecular sieves, e.g., aluminophosphates, silicoaluminophosphates and zeolites, clays (such as kaolin clay), carbon monoxide oxidation promoters, etc.

It is anticipated that the catalyst in most instances will include between about 5 and about 40 weight percent large pore zeolite and a clay component, preferably a kaolin clay, in an amount between about 30 and about 85 percent by weight based on the total weight of the catalyst. The preferred catalysts will contain between about 10 and about 25 weight percent of a large pore zeolite, preferably a Y zeolite, and between about 5 percent by weight and about 25 percent by weight of a silica and/or an alumina component, and between about 45 percent by weight and about 75 percent by weight of a clay, preferably kaolin clay, such weights being based on the total weight of the catalyst.

The finished catalyst, formed of at least one large pore zeolite and at least one inorganic oxide matrix component, may be formed into the final form for the catalyst by standard catalyst forming techniques. Such catalysts are generally formed by spray drying procedures, such being well known in the art, or may be formed as extruded pellets. The extruded pellets may be dried in an air purge. Extruded pellets may then be crushed and sized to the desired size, e.g., less than 150 microns.

The combination of the large pore zeolite and the inorganic oxide matrix component may be exchanged with ammonium and/or other cations before treatment with the fluoro salt. Such ion-exchange steps are generally carried out by slurrying the mixture of zeolite and/or inorganic oxide matrix with between 5 to 15 volumes of water per the volume of large pore zeolite and/or inorganic oxide matrix after which a salt of the selected cation, e.g., ammonium or rare earth cation, may be added to the slurry. The resulting mixture is typically heated to a temperature above about 50° C. for a period between about 0.5 hours and about 3 hours. The mixture is then filtered and water-washed until excess anion is removed. The process is typically repeated one or more times according to the above described procedure. Techniques for the ion-exchange of matrixed catalysts are disclosed in U.S. Pat. No. 3,930,987, incorporated herein by reference thereto, and such are generally employable herein.

The instant catalysts are well suited for use in all types of catalytic cracking processes. Such processes can be conducted in any conventional catalytic cracking manner by employing the cracking catalysts of the instant invention. The catalysts of this invention are particularly applicable to fluid catalytic cracking (FCC) processes. Suitable catalytic cracking conditions include a temperature ranging from about 400° F. to about 1300° F., more typically between 900° F. to 1100° F., and a pressure ranging from subatmospheric to about superatmospheric pressure, typically from about atmospheric to about 100 psig. The process may be carried out in a fixed bed, moving bed, ebulliating bed, slurry, transferline, batchwise, riser unit or fluidized bed operation. The catalysts of the present invention can be used to convert any of the conventional hydrocarbon feeds used in catalytic cracking, e.g., crude oil-derived feedstocks, that is, it can be used to crack naphthas, gas oils and residual oils, including those having a high content of metal contaminants. If is especially suited for cracking hydrocarbons boiling in the gas oil range, that is, hydrocarbon oils having an atmospheric pressure boiling point ranging from about 450° to about 1100° F. to naphthas to yield not only products having a lower boiling point than the initial feed but also products having an improved octane number. Hydrocarbon fractions employable herein include gas oils, residual oils, cycle stocks, whole top crudes and heavy hydrocarbon fractions derived by the destructive hydrogenation of coal, tar pitches, asphalts and the like.

CATALYST PREPARATION

Catalysts were formed by preparing catalyst formulations having the following relative proportions, based on a dry weight basis:

| Component | Weight Percent |
|---|---|
| Zeolite Y (Y-52) | 18 |
| $SiO_2$ | 20 |
| Kaolin clay | 62 |

The $SiO_2$ source was an acid silica sol prepared using an aqueous mineral acid solution buffered to a pH of about 3. The mixture was then cooled to room temperature (18° C.–22° C.). This mixture was mixed with a 53 weight percent aqueous solution of $Na_2SiO_3$ by pumping the two solutions through a mixer. The relative flow rates of the two solutions were adjusted to maintain the pH of the product at about 2.8 and solid products, if any, were removed as formed.

The catalysts were formed by adding the kaolin clay component to the acid silica sol (containing 6.3 percent by weight $SiO_2$ in water). The mixture was blended for about 10 minutes. The zeolite Y was added to this mixture with enough water to give a slurry having 25 percent by weight solids. The pH of the mixture was adjusted to less than 4.5 (4.3–4.4) by addition of sulfuric acid. The mixture was then mixed for 10 minutes. The mixture was then spray dried at 175° (contact time less than about 5 seconds) and the produced sized to exclude particles greater than 150 microns. The final catalyst had an average particle size of about 64 microns.

The spray dried mixture of zeolite, $SiO_2$ and kaolin clay was employed to form a catalyst by preparing a slurry of 500 grams of the mixture in 4 liters of water at 75° C. The slurry is mixed for 5 minutes and filtered. The product was treated with $(NH_4)_2SO_4$ by being slurried at 50° C. in 4 liters of a $(NH_4)_2SO_4$ solution (160 grams of $(NH_4)_2SO_4$ in 4 liters of $H_2O$). The product was filtered. The filtered solid is reslurried in 4 liters of a $(NH_4)_2SO_4$ solution at 75° C. where the solution is prepared by dissolving 200 grams of $(NH_4)_2SO_4$ in 4 liters of distilled water. The slurry was mixed for 30 minutes. A 10% by weight solution of ammonium hexafluorosilicate solution was added to the slurry by adding 168 milliliters dropwise over a period of one hour and the pH of the slurry maintained at pH 8 by addition of a 20 percent by weight aqueous solution of $NH_4OH$ by constant addition of the $NH_4OH$. The mixture was then cooled to 50° C. To this mixture there was added 54.2 grams of $Al_2(SO_4)_3$. The resulting mixture was mixed for two hours, filtered, the solid product washed with 2 liters of distilled water at 50° C. and filtered and then the solid product was slurried at 50° C. in 4 liters of an $(NH_4)_2SO_4$ solution (160 grams of $(NH_4)_2SO_4$ in 4 liters of $H_2O$), mixed for 10 minutes and filtered. The solid product was then washed with 4 liters of distilled water at 50° C. and filtered. The previous step was repeated one additional time except that instead of first washing the solid product with 4 liters of distilled water the product was washed with 10 liters of water at 50° C. which has had the pH adjusted to 9.0 by addition of $NH_4OH$. The wash liquid was tested for sulfate anions and washing continued until sulfate was not qualitatively detected (e.g., less than about 500 ppm). When a catalyst was rare earth cation exchanged the rare earth exchange was carried out with a solution containing several rare earth chlorides in amounts sufficient to provide the desired rare earth contents. The rare earth chloride solution employed was obtained from Molycorp, Inc., solid under Product No. 5240, and has the following chemical analyses, expressed as the oxides:

|  | Weight Percent |
| --- | --- |
| $La_2O_3$ | 60.0 |
| $Nd_2O_3$ | 21.5 |
| $CeO_2$ | 10.0 |
| $Pr_6O_{11}$ | 7.5 |
| Other $RE_2O_3$ | 1.0 |

The rare earth chloride-containing solution was added to a slurry of the catalyst which had been adjusted to about pH 4.5 l with acid. The final solid product was either air dried for 10 to 24 hours or was dried overnight (6 hours to 12 hours) at 100° C. in air.

EXAMPLES 1 TO 4

Four catalysts were prepared as above described. The catalysts were steam deactivated (100% steam) for 2 hours to simulate the deactivation of cracking catalysts occurring in commercial cracking operation. The catalysts were chemically analyzed and were evaluated by microactivity testing (MAT) according to ASTM test method D-3907 employing a feedstock having an API gravity of 24.0°, an IBP (Initial Boiling Point) of 354° F., a FBP (Final Boiling Point) of 1077° F. and a UOP K Factor of 11.8. The UOP K Factor is defined as $$K = (T_B)^{\frac{1}{3}}/d$$

where "$T_B$" is the average boiling point in degrees Rankine and "d" is the specific gravity 60°/60° F. The chemical analysis, percent coke, percent gasoline selectivity and percent conversion are set forth in Table I. The Percent (%) Conversion is as defined in ASTM test method D-3907. The percent gasoline selectivity is the (weight of gasoline product/weight of feedstock)/(% Conversion). The % Coke is the (weight of coke)/(weight of feedstock). Gasoline products are hydrocarbon products containing from $C_5$ hydrocarbons (boiling at 110° F.) to hydrocarbons boiling at 430° F. Coke refers to hydrocarbons which are adsorbed by the catalysts and not removed by stripping.

EXAMPLE 5

The above catalyst preparation procedure for catalysts 1 to 4 was repeated, except that no $Al_2(SO_4)_3$ was added first after treatment with the ammonium fluorosilicate solution. The result of the chemical analysis of the product for $Na_2O$ is set forth in Table I.

EXAMPLE 6

The above catalyst preparation procedure for catalysts 1 to 4 was repeated, except that the ammonium fluorosilicate and aluminum sulfate solution was added in one step instead of over a period of time. The pH of the solution was adjusted to pH 8 by use of $NH_4OH$ before addition to the zeolite slurry and the pH of the slurry is adjusted to pH 8 by use of $NH_4OH$ after mixture. The chemical analysis of the product and evaluation according to ASTM Test Method D-3907, as employed for Examples 1 to 4, are set forth in Table I.

EXAMPLE 7

The above catalyst preparation procedure for catalysts 1 to 4 was repeated, except that the pH of the slurry was maintained at pH 9 instead of pH 8. The results of the chemical analysis of the product and the evaluation of the product according to the procedure employed for Examples 1 to 4 are set forth in Table I.

EXAMPLE 8

This is a comparative example wherein a catalyst was prepared as in Examples 1 to 4, except that the pH of the slurry was less than pH 7. The results of the evaluation of the product, as shown in Table I, show that the product was less active than a product having similar rare earth content, as shown by comparison to Example 3. The catalyst was evaluated according to the procedure employed for Examples 1 to 4 after steam deactivation at 1450° F. Surprisingly, the high pH treatment results in a product containing a slightly higher $Na_2O$ content and exhibits a higher Na₂O tolerance in the finished catalyst while still providing an active catalyst.

TABLE I

| Example | Steam Deactivation Temperature (°F.) | Na₂O[1] | RE₂O₃[1] | % Coke | % Gasoline Selectivity | % Conversion |
|---|---|---|---|---|---|---|
| 1 | 1450 | 0.31 | 0.66 | 1.19 | 71.9 | 67.4 |
| 2 | 1550 | 0.31 | 0.66 | 0.74 | 76.9 | 56.7 |
| 3 | 1450 | 0.29 | 1.98 | 1.49 | 66.6 | 73.3 |
| 5 | 1550 | 0.29 | 1.98 | 0.98 | 75.2 | 61.6 |
| 5 | — | 0.34 | 0 | — | — | — |
| 6 | 1550 | 0.24 | 0 | 0.70 | 77.1 | 54.9 |
| 7 | 1450 | 0.30 | 0 | 0.79 | 75.6 | 57.4 |
| 8 | 1450 | 0.13 | 1.95 | 0.73 | 76.3 | 62.5 |

[1]Weight percent based on total catalyst weight.

EXAMPLE 9

A catalyst was prepared according to the procedure of examples 1 to 4, except that the catalyst was treated with an equivalent molar amount of an ammonium sulfate solution instead of with the ammonium fluorosilicate whereby the ammonium sulfate solution contained an equivalent molar amount of ammonium ion as compared to that which was obtained by use of the ammonium hexafluorosilicate solution employed. A catalyst was prepared as in examples 1 to 4 except that no rare earth exchange was carried out. The final catalyst contained 0.412 weight percent Na₂O and zero weight percent rare earth.

These results demonstrate the importance of preparing the catalyst according to this invention by treatment of the large pore zeolite and inorganic oxide matrix with a fluoro salt and not simply by ammonium exchanging the zeolite-matrix composite.

EXAMPLE 10

A catalyst was prepared by forming a slurry by mixing 200 grams of the zeolite Y, SiO₂ and kaolin clay spray dried mixture employed in forming the catalysts in Examples 1 to 4 in 2 liters of water at 75° C. The mixture was filtered and the filtered solid added to two liters of a 4 percent by weight aqueous solution of (NH₄)₂SO₄ to form a slurry. The slurry was blended for 10 minutes, filtered and the solid product washed with 1 liter of water. The solid product was again slurried in 2 liters of the (NH₄)₂SO₄ solution, filtered and the solid product washed with water as above described. The solid product was slurried in two liters of a 4 percent by weight aqueous solution of (NH₄)₂SO₄. The slurry was mixed for 30 minutes and the pH of the slurry adjusted to about 7.5 by addition of NH₄OH. To this slurry was added 0.034 liters of a 10 percent by weight aqueous solution of ammonium fluorosilicate. The solution was added in a single addition step. The pH of the slurry was readjusted to 7.5 by addition of NH₄OH and the slurry maintained at pH 7.5 by addition of NH₄OH, as required, for 30 minutes. The slurry was cooled to 50° C., 21.7 grams of Al₂(SO₄)₃ added and the slurry mixed for 2 hours. The slurry was filtered and the solid product washed with 1 liter of water. The solid product was added to 2 liters of a 4 percent by weight aqueous solution of (NH₄)₂SO₄, mixed for 10 minutes and filtered. The solid product was washed with 1 liter of water. The solid product was then washed with 10 liters of water having a pH of 9, formed by addition of NH₄OH. Two samples of the final product were steam deactivated at 1450° F. and 1550° F., in 100% steam for 2 hours. The steam deactivated solid products were evaluated by ASTM test method D-3907 and the percent conversion measured. The gasoline selectivity and percent coke were calculated. The results were as follows:

| | Steam Deactivation Temperature | |
|---|---|---|
| | 1450° F. | 1550° F. |
| % Conversion | 72.1 | 56.3 |
| % Gasoline Selectivity | 70.7 | 78.4 |
| % Coke | 1.17 | 0.67 |

What is claimed is:

1. A process for preparing a catalyst comprising the following steps:
   (i) contacting a mixture of a large pore zeolite and an inorganic oxide matrix, with a fluoro salt of the formula $$A_{(n-m)}[MF_n]_z \qquad (1)$$

wherein "A" is an organic or inorganic ionic moiety; $[MF_n]_z$ is a fluoroanion moiety comprising the element "M"; "M" is an element selected from the group of elements from Groups VB, VIB, VIIB, VIII, IIIA, IVA and VA of the Periodic Table of Elements; "n" is the coordination number of "M"; "m" is the valence of "M"; and "z" is the valence or charge associated with "A"; at a pH greater than 7, at effective conditions of temperature and time.

2. The process according to claim 1 comprising the additional steps of ammonium exchanging the product to provide a catalyst having a Na₂O content less than 2.0 percent by weight, based on the total weight of the zeolite employed in such catalyst wherein such Na₂O content is achieved without a Na₂O calcination.

3. The process of claim 1 or 2 wherein the product is cation exchanged with a catalytically effective amount of at least one rare earth cation selected from the class consisting of cerium, lanthanum, praseodymium, neodymium, promethium, samarium, europium, lutetium, gadolinium, terbium, dysprosium, holmium, erbium, thulium and ytterbium.

4. The process of claim 1 wherein said large pore zeolite is a Y zeolite having a SiO₂/Al₂O₃ ratio greater than about 3.5.

5. The process according to claim 4 wherein said Y zeolite has a SiO₂/Al₂O₃ ratio between about 3.5 and about 6.

6. The process according to claim 4 wherein said Y zeolite is at least partially in the ammonium cationic form.

7. The process of claim 1 wherein the effective pH is between 7.5 and about 9.0.

8. The process of claim 7 wherein the effective pH is between about 7.5 and about 8.5.

9. The process of claim 1 wherein the effective temperature is at least 50° C.

10. The process of claim 9 wherein the effective temperature is between about 50° C. and about 100° C.

11. The process of claim 1 wherein the effective time is between about 0.1 hours and about 2 hours.

12. The process of claim 11 wherein the effective time is between about 0.2 hour and about 1 hours.

13. The process of claim 1 wherein the fluoro salt is provided in an amount between about 0.01 and about 0.25 moles per 100 grams of large pore zeolite.

14. The process of claim 5 wherein the fluoro salt is provided in an amount between about 0.05 and about 0.25 moles per 100 grams of large pore zeolite.

15. The process of claim 2 wherein the catalyst contains less than 1.5 percent by weight $Na_2O$, based on the total weight of the large pore zeolite.

16. The process of claim 15 wherein the catalyst contains less than 1.0 percent by weight $Na_2O$ based on the total weight of the large pore zeolite.

17. The process of claim 1 wherein the inorganic oxide matrix is selected from the group consisting of silicas, aluminas, silica-aluminas, clays and mixtures thereof.

18. The process of claim 17 wherein the zeolite and inorganic oxide matrix comprise a mixture of between about 5 and about 40 percent by weight of the large pore zeolite, 10 percent and about 25 percent by weight of at least one of silica and alumina and between about 45 percent and about 75 percent of a clay.

19. The process of claim 18 wherein the zeolite and inorganic oxide matrix comprise a mixture of between about 10 and about 25 percent by weight zeolite, between about 10 percent and about 25 percent by weight of at least one of silica and alumina and between about 45 percent and about 75 percent of a kaolin clay.

20. The process of claim 18 wherein the zeolite is zeolite Y, the silica is an acid silica sol and the clay is a kaolin clay.

21. The process of claim 18 wherein the alumina is an acid alumina sol.

22. The process of claim 19 wherein the zeolite is present in an amount of between about 15 and about 20 percent by weight, based on the total weight of the catalyst.

23. The process of claim 18 wherein the final product contains less than 2.0 percent by weight $Na_2O$, based on the total weight of the zeolite, and between about 0.1 and about 10 weight percent of at least one rare earth cation, based on the weight of zeolite.

24. The process of claim 1 wherein at least 40 percent of the crystallinity of the starting large pore zeolite is retained by the zeolite in the catalyst.

25. The process of claim 1 wherein said large pore zeolite is selected from the group consisting of zeolite Y, zeolite X, zeolite beta, Zeolite ZK-20, zeolite LZ-210, Zeolite ZSM-3 and mixtures thereof.

26. The process of claim 25 wherein said zeolite is a mixture of a Y zeolite and LZ-210.

27. The process of claim 25 wherein said zeolite is Zeolite beta.

28. The process of claim 26 wherein said zeolite is Zeolite ZK-20.

29. The process of claim 25 wherein said zeolite is ZSM-3.

30. The process of claim 25 wherein said zeolite is LZ-210.

31. The process of claim 1 wherein "M" is selected from the group consisting of silicon, phosphorus, antimony, bismuth, palladium, platinum, iridium, iron, rhenium, molybdenum, tantalum, titanium and mixtures thereof.

32. The process of claim 31 wherein "M" is selected from the group consisting of silicon, titanium and mixtures thereof.

33. The process of claim 1 wherein "A" is selected from the group consisting of cations of ammonium, quaternary ammonium and mixtures thereof.

34. The process of claim 33 wherein the fluoro salt is ammonium hexafluorosilicate.

35. The process for the preparation of a catalyst wherein said process comprises:
  (i) contacting a mixture of a non-calcined Y zeolite having a $SiO_2/Al_2O_3$ ratio of between about 3.5 and about 6, and at least one inorganic oxide matrix component, said matrix comprising a mixture of a kaolin clay and at least one of silicas, aluminas, silica-aluminas, with a fluoro salt selected from the group consisting of ammonium hexafluorosilicate, ammonium hexafluorotitanate and mixtures thereof in an amount of at least 0.0075 moles per 100 grams of Y zeolite, at a pH value greater than 7 to about 9 at effective conditions of temperature and time; and
  (ii) ammonium exchanging the product of step (i) to provide a catalyst having a $Na_2O$ content less than 2.0 percent by weight based on the total weight of the Y zeolite employed in the catalyst.

36. The process according to claim 35 wherein said product of step (ii) is prepared in the absence of a $Na_2O$ calcination.

37. The process of claim 35 wherein said zeolite is zeolite Y having a $SiO_2$ to $Al_2O_3$ ratio between about 4.5 and 6.0, said fluoro salt is ammonium hexafluorosilicate and said temperature is greater than 50° C.

38. The process according to claim 35 wherein the product of step (ii) is provided with a catalytically effective amount of at least one rare earth cation selected from the class consisting of cerium, lanthanum, praseodymium, neodymium, promethium, samarium, europium, lutetium, gadolinium, terbium, dyspromium, holmium, erbium, thulium and ytterbium to provide between about 0.1 to about 20 weight percent of at least one rare earth cation, based on the weight of the Y zeolite employed in such catalyst.

39. The process of claim 35 wherein said zeolite is a Y zeolite having a $SiO_2/Al_2O_3$ ratio between about 3.5 and about 6 and is at least partially in the ammonium cationic form.

40. The process of claim 35 wherein the effective pH is between about 7.5 and about 9.0.

41. The process of claim 1 wherein the effective temperature is at least 50° C.

42. The process of claim 41 wherein the effective temperature is between about 75° C. and about 150° C.

43. The process of claim 41 wherein the effective time is between about 0.1 hours and about 2 hours.

44. The process of claim 35 wherein the fluoro salt is provided in an amount between about 0.05 and about 0.2 moles per 100 grams of large pore zeolite.

45. The process of claim 35 wherein the catalyst contains less than 1.5 percent by weight $Na_2O$, based on the total weight of the Y zeolite employed in the catalyst.

46. The process of claim 45 wherein the catalyst contains less than 1.0 percent by weight Na$_2$O based on the total weight of the Y zeolite employed in the catalyst.

47. The process of claim 35 wherein the inorganic oxide matrix is selected from the group consisting of silicas, aluminas, silica-aluminas, clays and mixtures thereof.

48. The process of claim 47 wherein the Y zeolite and inorganic oxide matrix comprise a mixture of between about 5 and about 40 percent by weight Y zeolite, 10 percent and about 25 percent by weight of at least one of silica and alumina and between about 45 percent and about 75 percent of a clay.

49. The process of claim 48 wherein the zeolite and inorganic oxide matrix comprise a mixture of between about 10 and about 25 percent by weight Y zeolite, between about 10 percent and about 25 percent by weight of at least one of silica and alumina and between about 45 percent and about 75 percent of a kaolin clay.

50. The process of claim 48 wherein the zeolite is a zeolite Y having a SiO$_2$/Al$_2$O$_3$ ratio between about 3.5 and about 6, the silica is an acid silica sol and the clay is a kaolin clay.

51. The process of claim 49 wherein the alumina is an acid alumina sol.

52. The process of claim 35 wherein the Y zeolite is present in an amount of between about 15 and about 20 percent by weight, based on the total weight of the catalyst.

53. The process of claim 35 wherein the final product contains less than 1.5 percent by weight Na$_2$O, based on the total weight of the zeolite, and between about 0.1 and about 10 weight percent of at least one rare earth cation.

54. A process for preparing a non-calcined catalyst having a Na$_2$O content less than 2.0 percent by weight, based on the zeolite component of the catalyst, comprising the following steps:
(i) contacting a mixture of a Y zeolite having a SiO$_2$/Al$_2$O$_3$ ratio between about 3.5 and 6 and an inorganic oxide matrix, with a fluoro salt of the formula $$A_{(n-m)}[MF_n]_z \qquad (1)$$

wherein "A" is an organic or inorganic ionic moiety; [MF$_n$]$_z$ is a fluoroanion moiety comprising the element "M"; "M" is an element selected from the group of elements from Groups VB, VIB, VIIB, VIII, IIIA, IVA and VA of the Periodic Table of Elements; "n" is the coordination number of "M"; "m" is the valence of "M"; and "z" is the valence or charge associated with "A"; at a pH from 7.5 to about 9.0 in an amount of at least .0075 moles per 100 grams of the Y zeolite, on an anhydrous basis;
(ii) ammonium exchanging the product of step (i) to provide a non-Na$_2$O calcined catalyst having a Na$_2$O content less than 2.0 percent by weight, based on the total weight of the Y zeolite employed in the catalyst.

55. The process of claim 54 wherein the product of step (ii) is cation exchanged with at least one rare earth cation selected from the group consisting of cerium, lanthanum, praseodymium, neodymium, promethium, samarium, europium, lutetium, gadolinium, terbium, dysprosium, holmium, erbium, thulium and ytterbium to provide a product containing between about 0.1 to about 10 percent by weight rare earth, as the oxide, based on the weight of the Y zeolite employed in the catalyst.

56. The catalyst prepared by the process of claim 1.
57. The catalyst prepared by the process of claim 2.
58. The catalyst prepared by the process of claim 3.
59. The catalyst prepared by the process of claim 18.
60. The catalyst prepared by the process of claim 35.
61. The catalyst prepared by the process of claim 54.
62. The catalyst prepared by the process of claim 55.

63. The process for preparing catalysts consisting essentially of the steps of:
(i) contacting a mixture of a large pore zeolite selected from the class consisting of zeolite Y, zeolite X, zeolite beta, zeolite LZ-210, zeolite ZK-20, zeolite ZSM-3 and mixtures thereof and an inorganic oxide matrix component selected from the group consisting of aluminas, silicas, silica-aluminas, clays, and mixtures thereof with a fluoro salt, wherein the fluoro salt is of the formula $$A_{(n-m)}[MF_n]_z \qquad (1)$$

wherein "A" is an organic or inorganic ionic moiety; [MF$_n$]$_z$ is a fluoroanion of element "M"; "M" is at least one of boron, aluminum, gallium, silicon, phosphorus, antimony, bismuth, palladium, platinum, iridium, iron, rhenium, molybdenum, tantalum and titanium; "n" is the coordination number of "M"; "m" is the valence of "M"; and "z" is the valence or charge associated with "A"; at a pH greater than 7 for an effective time at an effective temperature;
(ii) ammonium exchanging the product of step (i);
(iii) rare earth exchanging the product of step (ii) to provide an effective amount of rare earth;
(iv) obtaining without Na$_2$O calcination a product containing less than 1.2 weight percent Na$_2$O, based on the weight of the zeolite employed in the catalyst, at least 60 percent crystal retention of the starting zeolite and between about 0.1 and about 20 weight percent of at least one rare earth element cation selected from the group consisting of cerium, lanthanum, praseodymium, neodymium, promethium, samarium, europium, lutetium, gadolinium, terbium, dysprosium, holmium, erbium, thulium and ytterbium.

64. The process of claim 63 wherein the large pore zeolite is zeolite Y and the fluoro salt is selected from the group consisting of fluorosilicates, fluorotitanates and mixtures thereof.

65. The process of claim 1 wherein said process is carried out in the presence of an aluminum salt.

66. The process of claim 1 wherein said process is carried out in the presence of aluminum sulfate.

67. The process of claim 35 wherein said process is carried out in the presence of an aluminum salt.

68. The process of claim 67 wherein said aluminum salt is aluminum sulfate.

69. The process of claim 37 wherein said process is carried out in the presence of an aluminum salt.

70. The process of claim 69 wherein said aluminum salt is aluminum sulfate.

71. The process of claim 54 wherein said process is carried out in the presence of an aluminum salt.

72. The process of claim 71 wherein said aluminum salt is aluminum sulfate.

73. The process of claim 63 wherein said process is carried out in the presence of an aluminum salt.

74. The process of claim 73 wherein said aluminum salt is aluminum sulfate.

* * * * *

UNITED STATES PATENT AND TRADEMARK OFFICE
CERTIFICATE OF CORRECTION

PATENT NO. : 4,591,576
DATED : May 27, 1986
INVENTOR(S) : Chiang, et al

It is certified that error appears in the above-identified patent and that said Letters Patent is hereby corrected as shown below:

Column 1, line 39, change "having" to -- have --

Column 1, line 51, change "then" to -- than --

Column 7, line 53, change "effectiv" to -- effective --

Column 9, line 53, change "60," to -- $\underline{60}$, --

Column 13, line 12, change "produced" to -- product --

Column 13, line 54, change "solid" to -- sold --

Column 13, line 66, change "pH 4.51" to -- pH 4.5 --

Column 14, line 33, delete "first"

Signed and Sealed this

Second Day of September 1986

[SEAL]

Attest:

DONALD J. QUIGG

Attesting Officer

Commissioner of Patents and Trademarks